United States Patent
Plata et al.

(10) Patent No.: US 12,071,895 B2
(45) Date of Patent: Aug. 27, 2024

(54) TURBINE LOAD COUPLING COOLING SYSTEM

(71) Applicant: General Electric Company, Schenectady, NY (US)

(72) Inventors: Gerardo Plata, Santiago de Queretaro (MX); Jorge Mario Rochin Machado, Queretaro (MX); Ravinder Yerram, Sugar Land, TX (US); Balakrishnan Ponnuraj, Sugar Land, TX (US); Tho Vankhanh Nguyen, Cypress, TX (US)

(73) Assignee: GE Infrastructure Technology LLC, Greenville, SC (US)

( * ) Notice: Subject to any disclaimer, the term of this patent is extended or adjusted under 35 U.S.C. 154(b) by 339 days.

(21) Appl. No.: 17/228,794

(22) Filed: Apr. 13, 2021

(65) Prior Publication Data
US 2022/0325667 A1 Oct. 13, 2022

(51) Int. Cl.
| | |
|---|---|
| *F02C 7/18* | (2006.01) |
| *F01D 25/12* | (2006.01) |
| *F01D 25/14* | (2006.01) |
| *F01D 25/30* | (2006.01) |

(52) U.S. Cl.
CPC ............... *F02C 7/18* (2013.01); *F01D 25/12* (2013.01); *F01D 25/14* (2013.01); *F01D 25/30* (2013.01); *F05D 2260/201* (2013.01)

(58) Field of Classification Search
CPC .......... F01D 5/026; F01D 15/10; F01D 25/12; F01D 25/14; F01D 25/30; F02C 7/18; F05D 2240/60
USPC ....................................................... 415/116
See application file for complete search history.

(56) References Cited

U.S. PATENT DOCUMENTS

| | | | | |
|---|---|---|---|---|
| 7,493,769 | B2* | 2/2009 | Jangili | F01D 25/12 |
| | | | | 415/180 |
| 8,596,980 | B2* | 12/2013 | Miller | F01D 5/225 |
| | | | | 416/190 |
| 2010/0202888 | A1* | 8/2010 | Miller | F01D 5/225 |
| | | | | 416/190 |
| 2013/0139516 | A1 | 6/2013 | Viti et al. | |
| 2018/0030853 | A1 | 2/2018 | Merchant et al. | |
| 2020/0208540 | A1 | 7/2020 | Rochin Machado et al. | |

FOREIGN PATENT DOCUMENTS

| | | |
|---|---|---|
| EP | 2599967 A1 | 6/2013 |
| EP | 3098419 A1 | 11/2016 |
| JP | 2000291446 A | 10/2000 |

OTHER PUBLICATIONS

Extended European Search Report for EP Patent Application No. 22165401.5 dated Sep. 14, 2022, 9 pages.

* cited by examiner

*Primary Examiner* — Woody A Lee, Jr.
*Assistant Examiner* — Justin A Pruitt
(74) *Attorney, Agent, or Firm* — Charlotte Wilson; James Pemrick; Hoffman Warnick LLC (57) ABSTRACT

A system for cooling a load coupling coupled to a gas turbine and disposed within an exhaust housing is provided. The system includes a shroud configured to be mounted about the load coupling, the shroud defining an inlet passage between the shroud and the load coupling and an outlet passage between the exhaust housing and the shroud. The system also includes a set of blades configured to couple to the load coupling. The set of blades are angled to draw air into the inlet passage as the set of blades rotate with the load coupling.

20 Claims, 9 Drawing Sheets

TURBINE LOAD COUPLING COOLING SYSTEM

TECHNICAL FIELD

The disclosure relates generally to gas turbines and, more particularly, to a system to cool a load coupling for a turbine.

BACKGROUND

Gas turbines are rotationally coupled to a load, such as a generator, by a load coupling. The load coupling includes, for example, a shaft that couples at a forward end to the rotor shaft of the gas turbine and at a rearward end to a rotating shaft of the load. A number of bearings may be used to rotationally support the rotor shaft, the load coupling, and the rotating shaft of the load. The load coupling extends through a tunnel, e.g., a cylindrical housing, within an exhaust housing of the gas turbine. Exhaust from the gas turbine passes through the exhaust housing radially externally of the tunnel. Cooler gas than the exhaust may enter the tunnel from a forward end thereof to provide some cooling of the load coupling. The load coupling may also be cooled by circulating air toward a rearward end of the load coupling and the exhaust housing using external blowers.

BRIEF DESCRIPTION

All aspects, examples and features mentioned below can be combined in any technically possible way.

An aspect of the disclosure provides a system for cooling a load coupling coupled to a gas turbine and disposed within an exhaust housing, the system comprising: a shroud configured to be mounted about the load coupling, the shroud defining an inlet passage between the shroud and the load coupling and an outlet passage between the exhaust housing and the shroud; and a set of blades configured to couple to the load coupling, the set of blades angled to draw air into the inlet passage as the set of blades rotate with the load coupling.

Another aspect of the disclosure includes any of the preceding aspects, and the exhaust housing defines a tunnel radially spaced from the shroud, and the inlet passage and the outlet passage fluidly couple together around a forward end of the shroud within the tunnel. The air flows in a forward direction in the inlet passage and a rearward direction in the outlet passage.

Another aspect of the disclosure includes any of the preceding aspects, and the tunnel and the load coupling define a radial opening at the forward end of the load coupling through which a gas from an upstream source enters and mixes with the air in the inlet and outlet passages.

Another aspect of the disclosure includes any of the preceding aspects, and the shroud has a frustoconical body and at least one of a forward end and a rear end thereof has an outwardly flared surface.

Another aspect of the disclosure includes any of the preceding aspects, and the set of blades includes a blade mount including a plurality of segments, each segment including at least one blade of the set of blades.

Another aspect of the disclosure includes any of the preceding aspects, and the blade mount is configured to couple to a shaft coupler at a rearward end of the load coupling.

Another aspect of the disclosure includes any of the preceding aspects, and further includes a shroud mount configured to mount the shroud in the exhaust housing in a spaced manner about the load coupling.

Another aspect of the disclosure includes any of the preceding aspects, and the shroud includes a number of segments, the number of segments configured to collectively form the shroud in a mounted state.

Another aspect of the disclosure includes any of the preceding aspects, and each blade is individually coupled to the load coupling.

Another aspect of the disclosure includes any of the preceding aspects, and the exhaust housing includes a cylindrical inner surface defining the outlet passage with the shroud.

Another aspect of the disclosure includes any of the preceding aspects, and each blade in the set of blades extends to a larger radial distance at a forward end thereof than at a rearward end thereof.

An aspect of the disclosure provides a gas turbine system, comprising: a gas turbine including a rotor shaft and an exhaust housing; a load coupling coupled to a rear end of the rotor shaft of the gas turbine and extending through the exhaust housing of the gas turbine; and a system for cooling the load coupling, the system including: a shroud configured to be mounted about the load coupling, the shroud defining an inlet passage between the shroud and the load coupling and an outlet passage between the exhaust housing and the shroud, and a set of blades configured to couple to the load coupling, the set of blades angled to draw the air into the inlet passage as the set of blades rotate with the load coupling.

Another aspect of the disclosure includes any of the preceding aspects, and the exhaust housing defines a tunnel radially spaced from the shroud, and the inlet passage and the outlet passage fluidly couple together around a forward end of the shroud within the tunnel. The air flows in a forward direction in the inlet passage and a rearward direction in the outlet passage.

Another aspect of the disclosure includes any of the preceding aspects, and the tunnel and the load coupling define a radial opening at the forward end of the load coupling through which a gas from an upstream source enters and mixes with the air in the inlet and outlet passages.

Another aspect of the disclosure includes any of the preceding aspects, and the shroud has a frustoconical body and at least one of a forward end and a rear end thereof has an outwardly flared surface.

Another aspect of the disclosure includes any of the preceding aspects, and the set of blades includes a blade mount including a plurality of segments, each segment including at least one blade of the set of blades.

Another aspect of the disclosure includes any of the preceding aspects, and the blade mount is configured to couple to a shaft coupler at an end of the load coupling.

Another aspect of the disclosure includes any of the preceding aspects and further includes a shroud mount configured to mount the shroud in the exhaust housing in a spaced manner about the load coupling.

Another aspect of the disclosure includes any of the preceding aspects, and the shroud includes a number of segments, the number of segments configured to collectively form the shroud in a mounted state.

Another aspect of the disclosure includes any of the preceding aspects, and each blade is individually coupled to the load coupling, and each blade includes a positioning element configured to hold a position of the blade relative to at least the load coupling.

An aspect of the disclosure provides a method of cooling a load coupling of a gas turbine including drawing air into a space through which the load coupling passes in an exhaust housing of the gas turbine. Using a shroud to divide the space, the air can be drawn forward between the shroud and the load coupling, and then passed rearward between the shroud and the exhaust housing.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a gas turbine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "rearward" or "aft," without any further specificity, refer to directions, with "forward" referring to the front or compressor end of the gas turbine system, and "rearward" and "aft" referring to the rearward section of the gas turbine system, i.e., closer to the load in a rear-end drive gas turbine system.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine, i.e., the rotor shaft and/or load coupling thereof.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a turbine load coupling cooling system. The system adds a set of blades to the load coupling and a shroud along the load coupling in order to introduce air from the ambient or from ventilation ductwork about the load coupling, and to redirect the hot air away from the load coupling to reduce the temperature of the load coupling during operation. The intention of the cooling system is to cool the load coupling by adding a set of blades, i.e., a propeller, and a physical division in a space between the exhaust housing and load coupling using a shroud. The cooling system separates the flow of the air from the hot exhaust, creating a trap for both gases and keeping the colder air in contact with the load coupling. The system provides a reliable cooling system for various load couplings, new and old, and reduces the high temperature of the load coupling during operation. The system also cools other structure such as instrumentation, sensors, bearing housings and fluid piping that may be inside parts of the system. In addition, the system avoids the need to use more specialized materials in the load coupling to address higher temperatures, thus saving costs for the end user.

Figure 1:
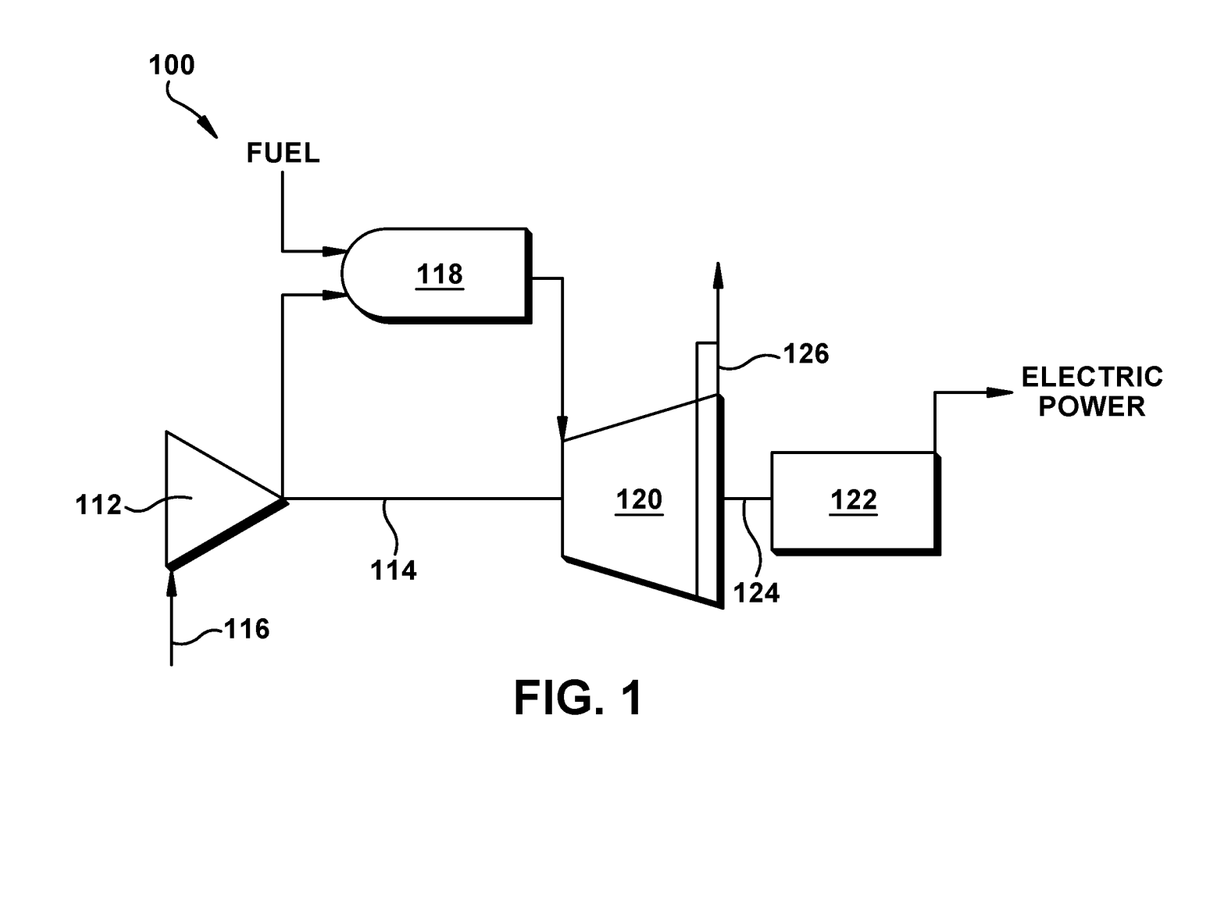
FIG. 1 shows a schematic diagram of an illustrative gas turbine system.

FIG. 1 is a schematic diagram for an illustrative gas turbine (GT) system 100. GT system 100 may be considered as including a multi-stage axial flow compressor 112 having a rotating shaft 114. Air enters the inlet of compressor 112 at point 116 and is compressed by axial flow compressor 112 and then is discharged to a combustor 118 where fuel such as natural gas is burned to provide high energy combustion gases which drive a gas turbine 120. In gas turbine 120, the energy of the hot gases is converted into work, some of which is used to drive compressor 112 through rotating shaft 114, with the remainder available for useful work to drive a load, such as a generator 122, via a rotor shaft 124 (i.e., an extension of rotating shaft 114) for producing electricity. Exhaust from GT system 100 is collected in an exhaust housing 126.

Figure 2:
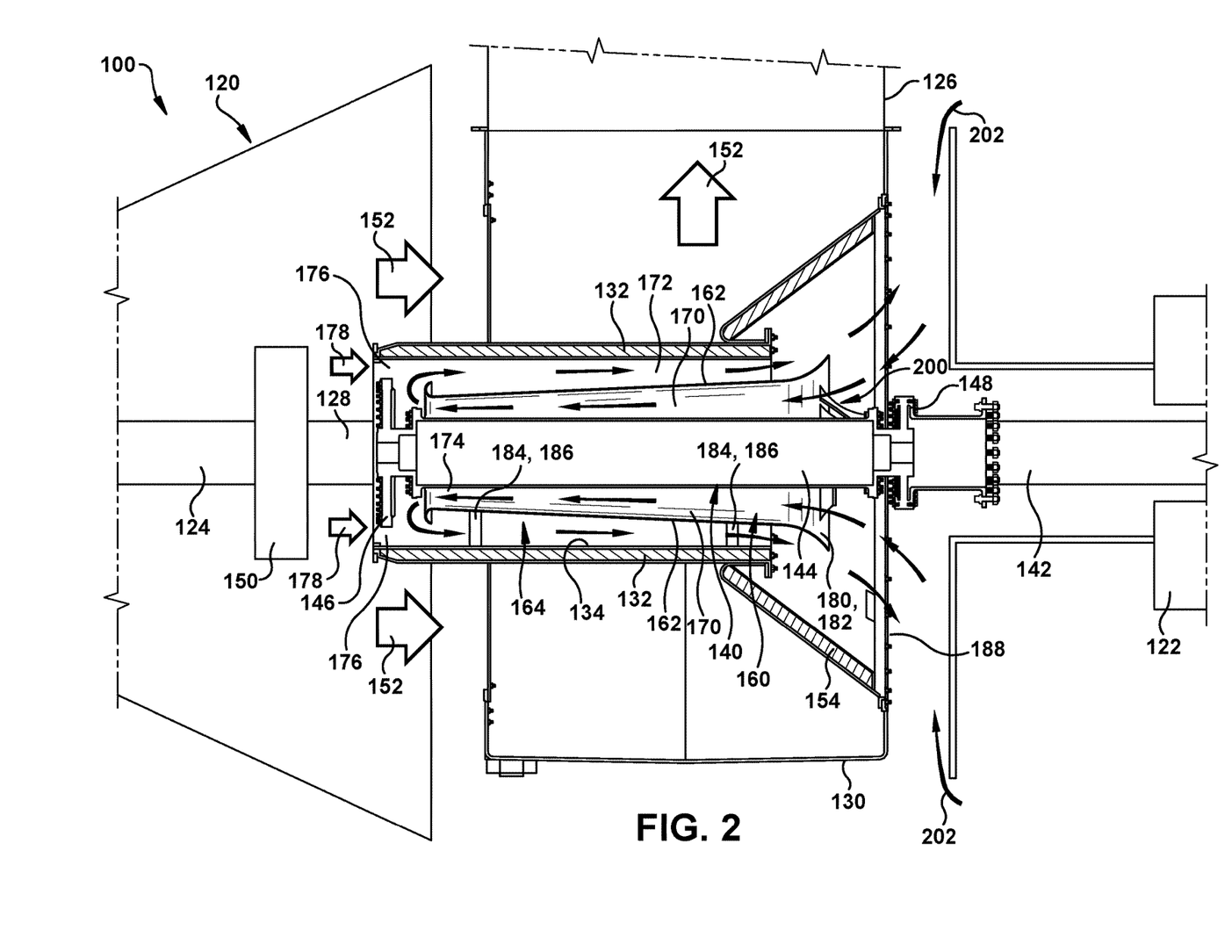
FIG. 2 shows a cross-sectional view of an exhaust housing and a load coupling including a cooling system, according to embodiments of the disclosure.
Figure 3:
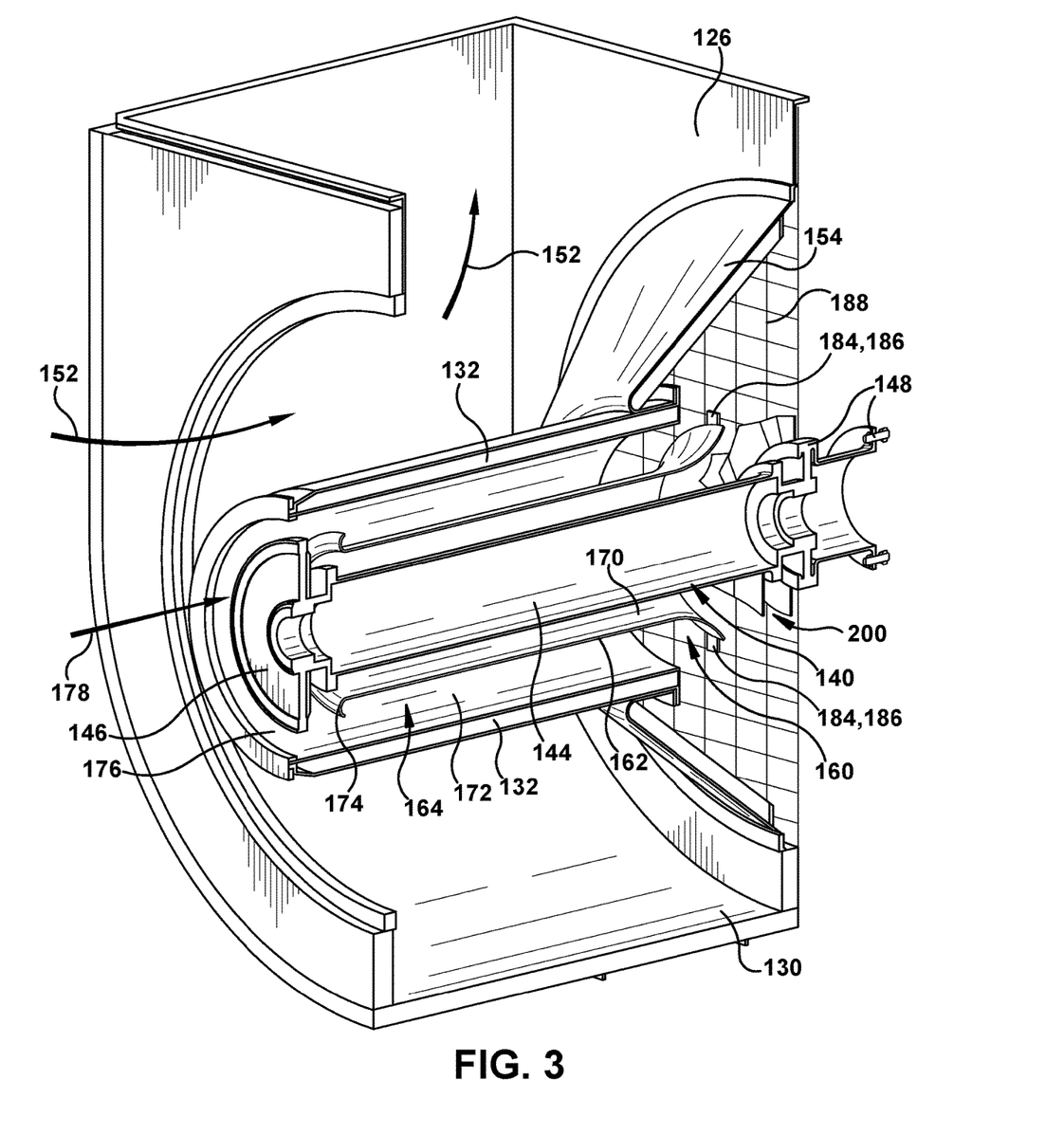
FIG. 3 shows a partial cross-sectional, perspective view of an exhaust housing and a load coupling including a cooling system, according to embodiments of the disclosure.

FIG. 2 shows an enlarged schematic view of GT system 100 and, in particular, exhaust housing 126 and a load coupling 140. FIG. 3 shows a partial cross-sectional, perspective view of exhaust housing 126 and load coupling 140. As shown, exhaust housing 126 includes an outer enclosure 130 including a tunnel 132 extending axially therethrough. Tunnel 132 can have any cross-sectional shape, but oftentimes has a cylindrical cross-section. Tunnel 132 has an inner surface 134. Exhaust housing 126 is positioned at a rearward end of gas turbine 120 and receives gas turbine exhaust 152. Exhaust housing 126 collects the various exhaust flows and redirects exhaust 152 for subsequent heating use or for release to atmosphere after any necessary environmental treatment. Exhaust housing 126, including tunnel 132, can be made of any material, such as metal or metal alloys, capable of withstanding the high temperatures of exhaust 152, e.g., at or above 537° C. (~1000° F.).

A load coupling 140 extends through tunnel 132 of exhaust housing 126. As shown in FIG. 2, load coupling 140 couples rotor shaft 124 of gas turbine 120 to a rotating shaft 142 of load 122, such as a generator, allowing rotational power to be transmitted to load 122 from gas turbine 120. More particularly, load coupling 140 couples to a rear end 128 (FIG. 2) of rotor shaft 124 of gas turbine 120 and extends through tunnel 132 of exhaust housing 126 of gas turbine 120. Load coupling 140 can include any structure capable of coupling two rotating shafts 124, 142, and of withstanding the mechanical forces applied thereto. Load coupling 140 can include, for example, a metal or metal alloy shaft 144. Load coupling 140 may also include a forward shaft coupler 146 coupling shaft 144 to rotor shaft 124, and a rearward shaft coupler 148 coupling shaft 144 to rotating shaft 142 of load 122. Each shaft coupler 146, 148 may include any now known or later developed system of coupling rotating elements, such as but not limited to paired, radially extending flanges that can be bolted together. Any number and variety of bearings (not all shown) may be provided to rotationally support the various shafts. For example, a gas turbine (GT) bearing 150 may rotationally support rotor shaft 124 and/or load coupling 140 upstream of exhaust housing 126.

As shown in FIGS. 2 and 3, exhaust 152 enters exhaust housing 126 and is collected and directed vertically (e.g., radially outward from load coupling 140). Exhaust housing 126 may also include an optional frusto-conical rear section 154 contiguous with tunnel 132 to direct exhaust 152 radially within exhaust housing 126. Exhaust 152 may be used, for example, as a heating source in any now known or later developed manner. The hot exhaust 152 has a temperature, e.g., at or above 537° C. (~1000° F.), which is too hot to provide cooling for load coupling 140. Here, tunnel 132 prevents the hot exhaust 152 from directly contacting load coupling 140. However, current GT systems 122 are using higher firing temperatures, resulting in hotter exhaust 152 that negatively affects cooling of load coupling 140, despite the presence of tunnel 132.

FIGS. 2 and 3 also show a system 160 for cooling load coupling 140, according to embodiments of the disclosure. As noted, load coupling 140 is coupled to gas turbine 120 and disposed within exhaust housing 126. System 160 includes a shroud 162 configured to be mounted about load coupling 140 and a set of blades 200 configured to draw air 202 (FIG. 2) over load coupling 140. Tunnel 132 is radially spaced from shroud 162. Thus, shroud 162 acts to separate a space 164 between load coupling 140 and tunnel 132 into separate passages 170, 172. More particularly, shroud 162 defines an inlet passage 170 between shroud 162 and load coupling 140, and an outlet passage 172 between shroud 162 and exhaust housing 126, e.g., tunnel 132 and/or frusto-conical rear section 154. Exhaust housing 126 includes inner surface 134 (of tunnel 132) that defines outlet passage 172 with shroud 162. Inlet passage 170 is shown as radially inward of outlet passage 172.

Shroud 162 may have a forward end 174 that is axially spaced from an end of load coupler 140, e.g., near forward shaft coupler 146, such that gas can pass from inlet passage 170 to outlet passage 172 about forward end 174 of shroud 162. Hence, inlet passage 170 and outlet passage 172 are fluidly coupled together around forward end 174 of shroud 162 within tunnel 132. As shown best in FIG. 3, tunnel 132 and load coupling 140 (and more particularly, forward shaft coupler 146 of load coupling 140) define a radial opening 176 at a forward end of load coupling 140. As will be described, a gas 178 from an upstream source may enter through radial opening 176 and mix with air in inlet and outlet passages 170, 172. The upstream source of gas 178 may include any upstream structure. In one non-limiting example, the upstream source may be, in part, exhaust 152 and leakage from a housing for GT bearing 150 used to rotatably support rotor shaft 124. It is noted that, because gas 178 is not as hot as exhaust 152, gas 178 may provide some level of cooling for load coupling 140, instrumentation, sensors, bearing housings and/or fluid piping within of shroud 162. In one non-limiting example, gas 178 may have a temperature in a range of 260° C. (~500° F.) to 370° C. (~700° F.).

Figure 4:
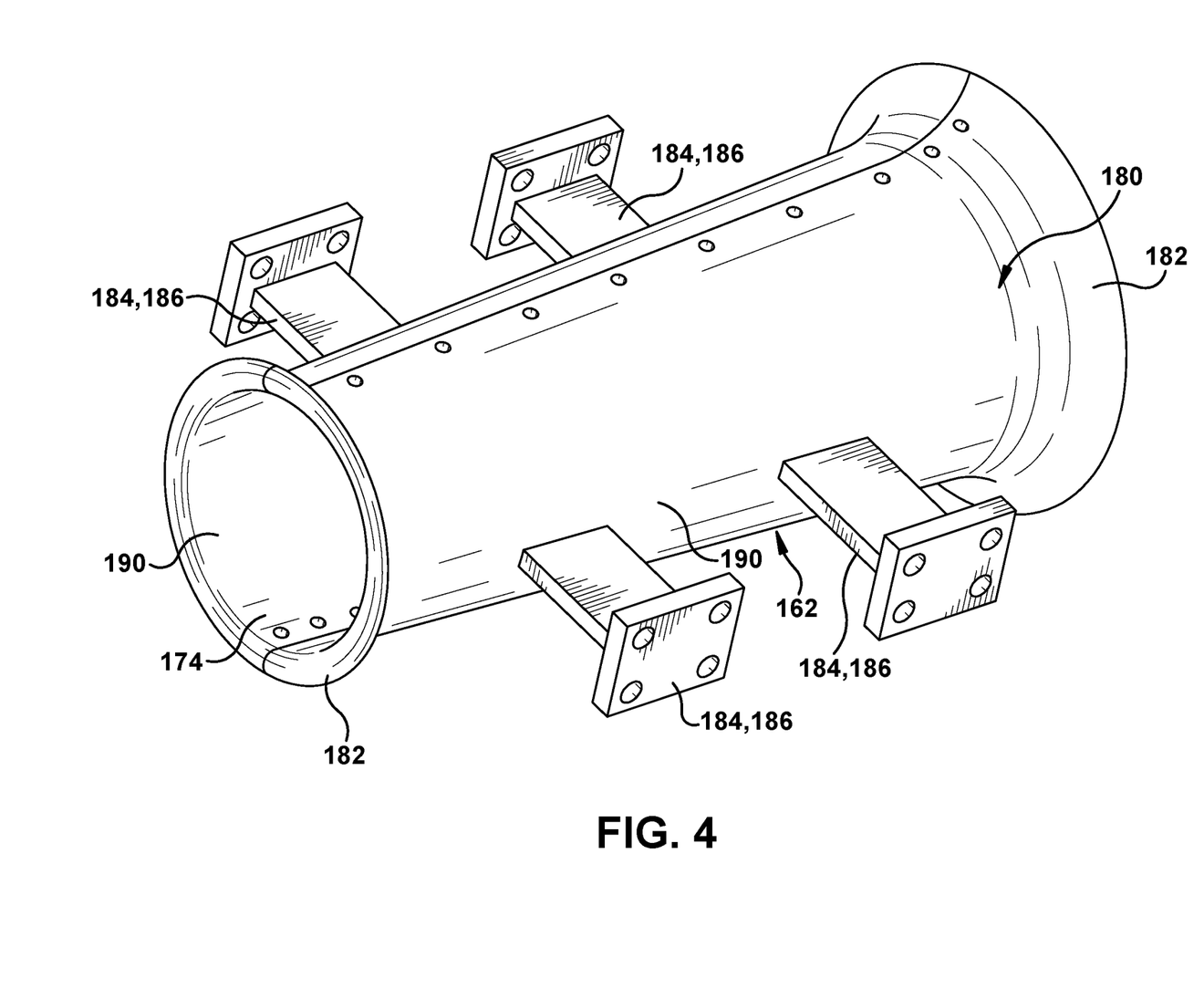
FIG. 4 shows a perspective view of a shroud for a cooling system, according to embodiments of the disclosure.

FIG. 4 shows a perspective view of an illustrative shroud 162 apart from GT system 100 (FIG. 3). Shroud 162 may include any structure and have any shape capable of segregating space 164 (FIG. 3), as described. In one embodiment, shroud 162 may have a cylindrical or slightly frusto-conical shape. As shown in FIG. 3, shroud 162 can be more cylindrical and, as shown in FIG. 4, shroud 162 can be more frusto-conical. In any event, shroud 162 may have at least one of a forward end 174 and a rear end 180 thereof with an outwardly flared surface 182, e.g., to direct gas in a desired direction. In alternative embodiments, outwardly flared surface(s) 182 may be omitted. Shroud 162 may be made of any material, such as a metal or metal alloy, capable of withstanding the environment within space 164. Shroud 162 may also include a shroud mount 184 configured to mount shroud 162 in exhaust housing 126 in a spaced manner about load coupling 140. Shroud mount 184 may include any now known or later developed mounting system capable of positioning shroud 162 as described in space 164. In one non-limiting example, shown in FIGS. 3 and 4, shroud mount 184 may include one or more arms 186 for coupling, e.g., with bolts, welds, or other fasteners, to exhaust housing 126, such as to tunnel 132. In other cases, shroud 162 may be mounted to any form of structure 188 positioned between exhaust housing 126 and load coupler 140 near rearward shaft coupler 148. In one non-limiting example, structure 188 may include a protective grille. Other mounting solutions may also be possible. In any event, as shown in FIG. 4, shroud 162 may optionally include a number of segments 190 that are configured to collectively form shroud 162 in a mounted state. Each segment 190 may provide any angular extent and any axial extent of shroud 162 deemed appropriate for easing installation of shroud 162. In the non-limiting example shown, each segment 190 provides 180° of shroud 162 and the full axial extent thereof. As will be recognized, any form of segmentation can be implemented to ease installation of shroud 162, e.g., on new or older GT systems 100.

Figure 5:
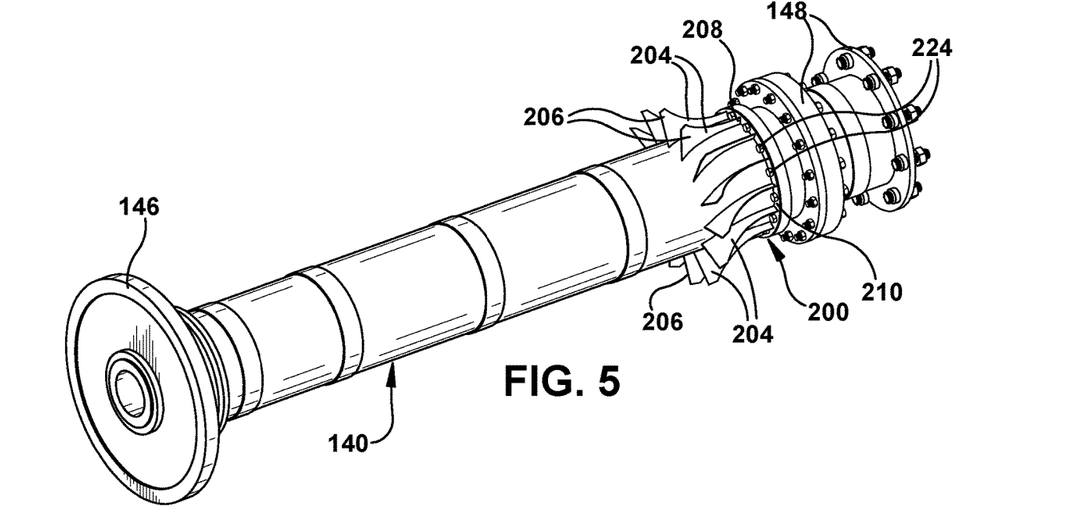
FIG. 5 shows a rearward perspective view of a set of blades on a load coupling, according to embodiments of the disclosure.
Figure 6:
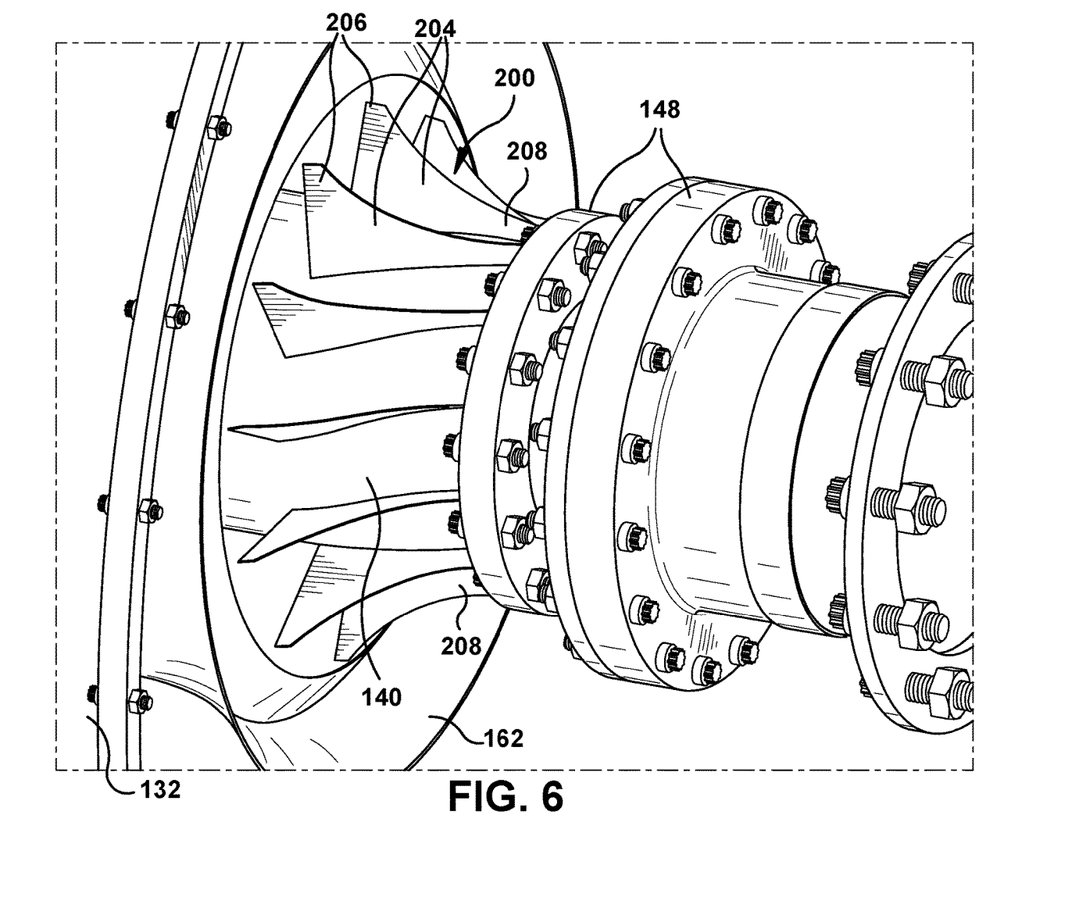
FIG. 6 shows an enlarged forward perspective view of a set of blades on a load coupling, according to embodiments of the disclosure.

As noted, system 160 for cooling load coupler 140 may also include set of blades 200 configured to couple to load coupling 140. FIG. 5 shows a rearward perspective view, and FIG. 6 shows an enlarged forward perspective view of load coupling 140 and set of blades 200. Set of blades 200 may include any number of blades 204 required to create the desired air 202 flow rate, volume, etc., over load coupling 140. As shown best in FIG. 5, set of blades 200 (i.e., each blade 204) are angled or curved so that they operate to draw air 202 along load coupling 140, i.e., in inlet passage 170. More particularly, as shown best in FIG. 2, set of blades 200 are angled or curved to draw air 202 into inlet passage 170 as set of blades 200 rotate with load coupling 140. Each blade 204 may have the same angle or curve, or they may vary. In certain embodiments, shown for example in FIG. 6, each blade 204 in set of blades 200 may extend to a larger radial distance at an axially forward end 206 thereof than at an axially rearward end 208 thereof. That is, they extend increasingly farther radially outward towards shroud 162 as air 202 passes into inlet passage 170. However, other variations in radial extent of blades 204 may also be employed. Axially forward ends 206 of blades may approach or contact load coupling 140 (see e.g., FIG. 5), and axially rearward ends 208 are coupled to rearward shaft coupler 148 via a blade mount 210. Air 202 may be sourced from any location, such as from ambient around generator 122, a ventilation system, a flow-creating propeller, or other source.

Figure 7:
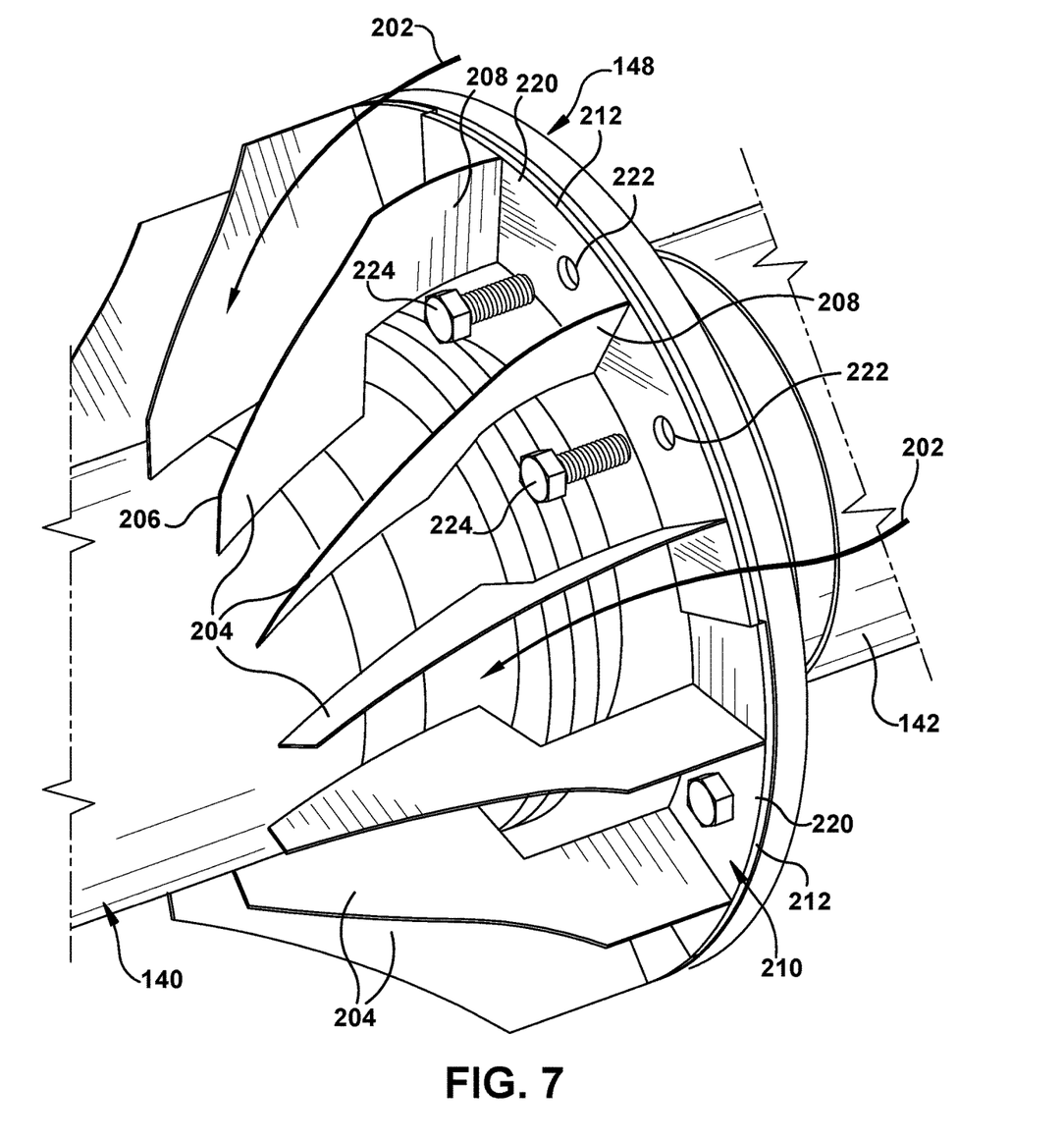
FIG. 7 shows an enlarged rearward perspective view of a set of blades on a load coupling, according to embodiments of the disclosure.

FIG. 7 shows an enlarged perspective view of set of blades 200. Set of blades 200 includes blade mount 210 configured to couple to shaft coupler 148 at a rearward end of the load coupling 140. As shown, blade mount 210 may include a plurality of segments 212 to ease installation of set of blades 200. Any number of segments 212 can be provided, e.g., 2, 3, 4, 5, 6, etc. Each segment 212 includes at least one blade 204 of set of blades 200. In this manner, set of blades 200 can be easily coupled to load coupling 140 in parts. In one embodiment, each segment 212 includes a radially extending arcuate flange 220 having a number of mounting holes 222 therein configured to match openings in, for example, rearward shaft coupler 148. Axially rearward ends 208 of blades 204 are fixedly coupled to a respective flange 220. In this manner, set of blades 200 can be mounted to load coupling 140 as it is being coupled to rotating shaft 142 of load 122. Flange(s) 220 can replace washers or act as extensions of washers used with fasteners 224 that are part of rearward shaft coupler 148.

Figure 8:
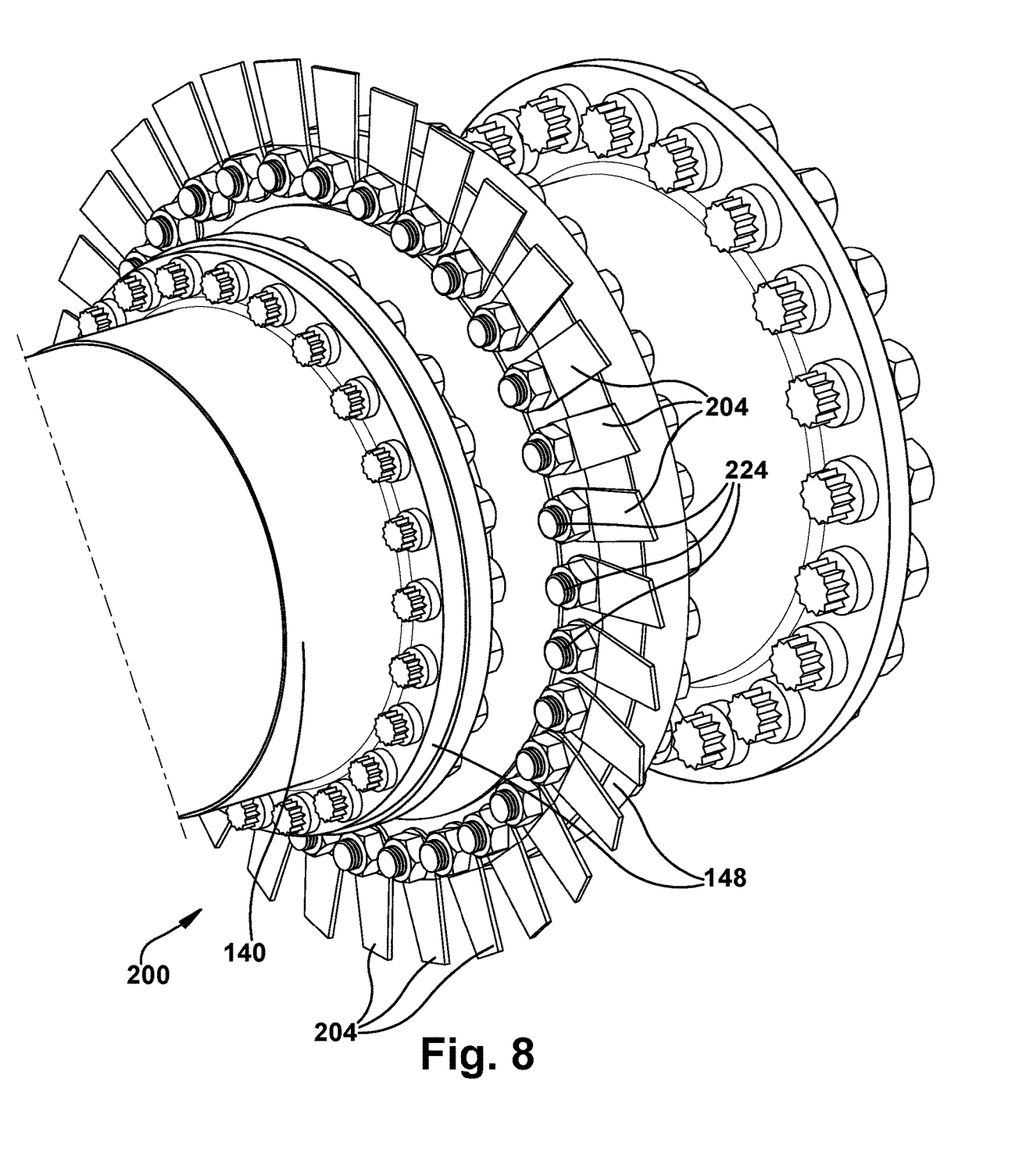
FIG. 8 shows a rearward perspective view of a load coupling and set of blades, according to alternative embodiments of the disclosure.
Figure 9:
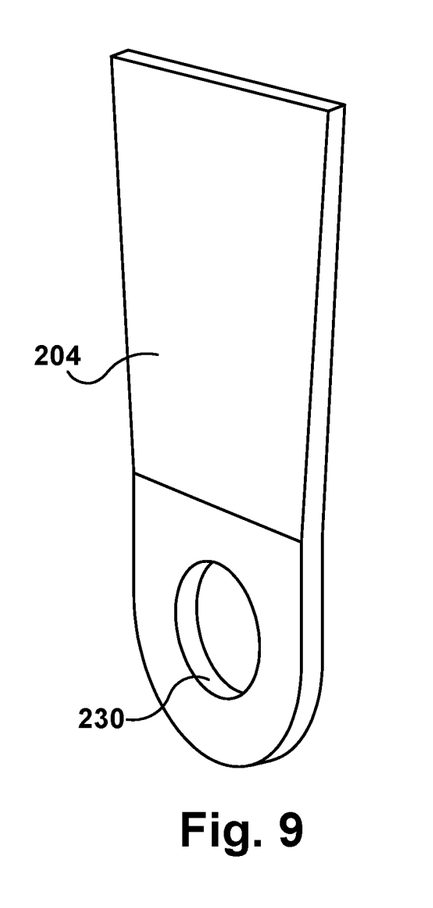
FIG. 9 shows an enlarged perspective view of a blade, according to alternative embodiments of the disclosure.
Figure 10:
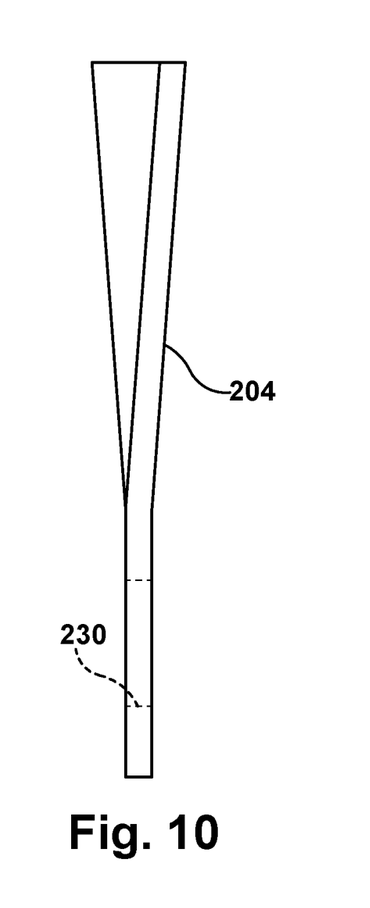
FIG. 10 shows a side view of the blade in FIG. 9.

FIG. 8 shows a rearward perspective view of load coupling 140 and set of blades 200, according to an alternative embodiment. FIG. 9 shows an enlarged perspective view and FIG. 10 shows a side view of one of the blades 204, according to the alternative embodiments. Here, each blade 204 is individually coupled to load coupling 104. In one example, each blade 204 may be coupled to load coupling 140 by a respective fastener 224, e.g., bolts or bolt/nut combinations, through openings 230 therein. Fasteners 224 may be part of, for example, rearward shaft coupler 148. In FIG. 8, blades 204 may be held in position by fasteners 224. Where necessary, additional structure may be employed to limit or prevent rotation, e.g., lock washers, male-female mating surfaces on blades 204 and load coupling 140, etc. As shown in FIGS. 8-10, each blade 204 in set of blades 200 is angled or curved so that they operate to draw air 202 along load coupling 140, i.e., in inlet passage 170. More particularly, as shown best in FIG. 10, each blade 204 is angled or curved to draw air 202 into inlet passage 170 as set of blades 200 rotate with load coupling 140. Each blade 204 may have the same angle or curve, or they may vary.

Figure 11:
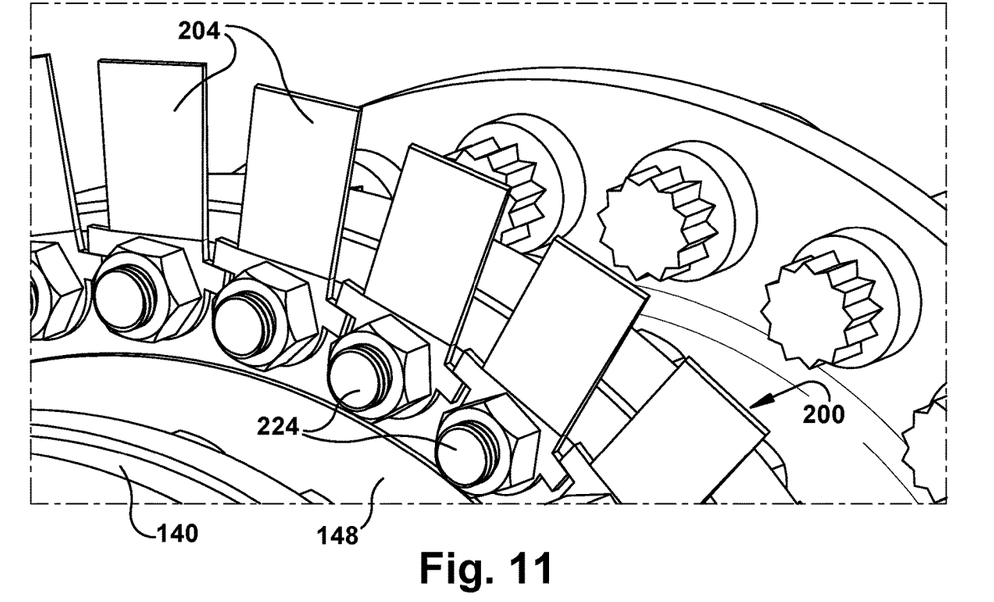
FIG. 11 shows a rearward perspective view of a load coupling and set of blades, according to additional alternative embodiments of the disclosure.
Figure 12:
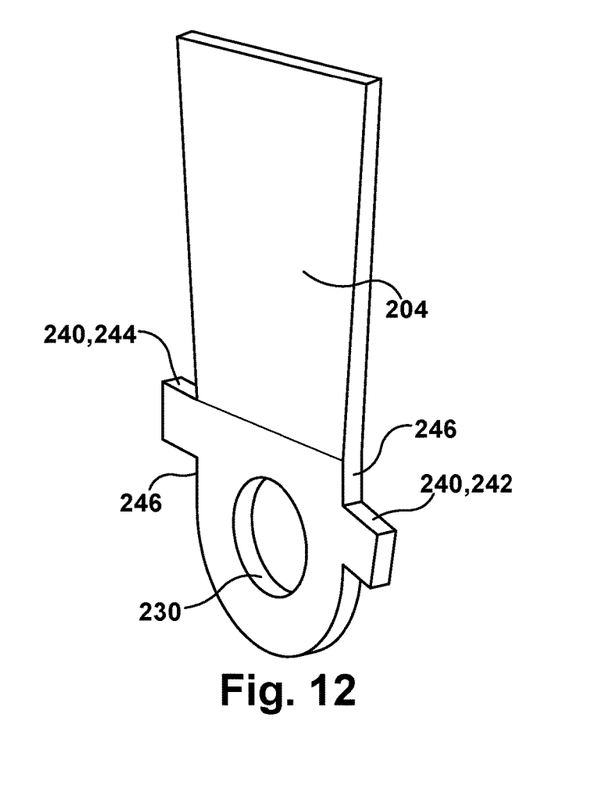
FIG. 12 shows an enlarged perspective view one of the blades in FIG. 11.

FIG. 11 shows a rearward perspective view of load coupling 140 and set of blades 200, and FIG. 12 shows an enlarged perspective view one of blades 204, according to other alternative embodiments. Here, each blade 204 may include a positioning element 240 configured to hold a position of a respective blade 204 relative to at least load coupling 140, other blades 204, and shaft coupler 148. Positioning element 240 is configured to maintain a position of a blade 204 and, in particular, to limit rotation of blade 204 relative to at least load coupling 140. Positioning element 240 may replace the structures listed previously herein to limit rotation, e.g., lock washers, or it may be used in conjunction with those structures. In one example, positioning element 240 may include an extension 242, 244 extending from sides 246 of blades 204 that engage with similar extensions 242, 244 on an adjacent blade 204. In the example shown, an extension 240 engages with an extension 242 of adjacent blade 204 to hold the blade position and limit rotation of one or both blades 204. In this manner, positioning elements 240 act to hold the blades' positions, interlock the blades and at least limit, and ideally prevent, rotation of blades 204 relative to at least load coupling 140. While a particular shape and size of positioning elements 240 have been disclosed, a large variety of alternative shapes and size of elements may be used. As shown in FIGS. 11-12, as in the previous embodiment, each blade 204 in set of blades 200 may be angled or curved so that they operate to draw air 202 along load coupling 140, i.e., in inlet passage 170. That is, each blade 204 may be angled or curved to draw air 202 into inlet passage 170 as set of blades 200 rotate with load coupling 140. Each blade 204 may have the same angle or curve, or they may vary.

With regard to the embodiments of FIGS. 8-12, while each fastener 224 is shown with a respective blade 204, that is not necessary in all cases. For example, in some cases, different numbers of blades 204 may be used, including but not limited to with: every other fastener 224 or every third fastener 224. In any of the embodiments described herein, the number of blades 204 (among other factors such as blade size, curvature, etc.) can be controlled to control the volume of air drawn in to cool load coupling 140 can be controlled.

As will be recognized, regardless of form, cooling system 160 can be mounted in a new GT system 100, or it can be retrofitted to an older GT system 100. The installation can occur in a manufacturing setting or on-site of a power plant.

In operation, a method of cooling load coupling 140 of gas turbine 120 includes drawing air 202 into space 164 through which load coupling 140 passes within exhaust housing 126 of the gas turbine. Air 202 is drawn by set of blades 200 rotating with load coupling 140 into space 164 and, more particularly, into inlet passage 170 defined between shroud 162 and load coupling 140. Using shroud 162 to divide space 164, air 202 can be drawn forward between shroud 162 and load coupling 140, i.e., in inlet passage 170. Inlet passage 170 and outlet passage 172 fluidly couple together around forward end 174 of shroud 162, e.g., within tunnel 132. Hence, air 202 passes about forward end 174 of shroud 162, and then passes rearward between shroud 162 and exhaust housing 126, e.g., tunnel 132 and/or frusto-conical rear section 154, and eventually out of exhaust housing 126. Hence, air 202 flows in a forward direction in inlet passage 170 (upstream when compared to working fluids in gas turbine 120 and exhaust 152), and a rearward direction in outlet passage 172 toward shaft coupler 148 at a rearward end of load coupling 140. As shown in FIGS. 2 and 3, in contrast to systems that blow air at exhaust housing 126, cooling system 160, i.e., shroud 162 and set of blades 200, are axially within exhaust housing 126, allowing improved, direct application of air 202 to load coupling 140. Some limited amount of gas 178 (FIGS. 2-3) may also enter space 164 through radial opening 176 (FIGS. 2-3) to cool. However, the hotter exhaust 152 does not enter space 164, and is prevented from entering space 164 by air 202 in the space.

Embodiments of cooling system 160 cool load coupling 140 by adding a set of blades, i.e., a propeller, and a physical division in space 164 between exhaust housing 126 and load coupling 140. Hence, cooling system 160 separates the flow of air 202 from the hot exhaust 152, creating a trap for both temperature gases and keeping the colder air 202 in contact with load coupling 140. Cooling system 160 thus provides reliable cooling for various load couplings 140, new and old, and reduces the high temperature of the load coupling during operation. The system also cools other structure such as instrumentation, sensors, bearing housings and fluid piping that may be inside parts of the system, to avoid failure or coking of these parts. In addition, cooling system 160 avoids the need to use more specialized materials in the load coupling to address high temperatures, thus saving costs for the end user.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A system for cooling a load coupling coupled to a gas turbine and disposed within an exhaust housing, the system comprising:
   a shroud configured to be mounted about the load coupling and concentrically within the exhaust housing, the shroud defining an inlet passage between the shroud and the load coupling and an outlet passage between the exhaust housing and the shroud; and
   a set of blades configured to couple to the load coupling, the set of blades angled to draw air into the inlet passage as the set of blades rotate with the load coupling.

2. The system of claim 1, wherein the exhaust housing defines a tunnel radially spaced from the shroud, and the inlet passage and the outlet passage fluidly couple together around a forward end of the shroud within the tunnel, wherein the air flows in a forward direction in the inlet passage and a rearward direction in the outlet passage.

3. The system of claim 2, wherein the tunnel and the load coupling define a radial opening at the forward end of the load coupling through which a gas from an upstream source enters and mixes with the air in the inlet and outlet passages.

4. The system of claim 1, wherein the outlet passage has a circular cross section, and wherein the shroud has a frusto-conical body, and at least one of a forward end and a rear end of the frusto-conical body has an outwardly flared surface.

5. The system of claim 1, wherein the set of blades includes a blade mount including a plurality of segments, each segment including at least one blade of the set of blades.

6. The system of claim 5, wherein the blade mount is configured to couple to a shaft coupler at a rearward end of the load coupling.

7. The system of claim 1, further comprising a shroud mount configured to mount the shroud in the exhaust housing in a spaced manner about the load coupling.

8. The system of claim 1, wherein the shroud includes a number of segments, the number of segments configured to collectively form the shroud in a mounted state.

9. The system of claim 1, wherein each blade is individually coupled to the load coupling.

10. The system of claim 1, wherein the exhaust housing defines a tunnel radially spaced from the shroud, the tunnel including a cylindrical inner surface; and wherein the shroud and the cylindrical inner surface of the tunnel define the outlet passage.

11. The system of claim 1, wherein each blade in the set of blades extends to a larger radial distance at a forward end thereof than at a rearward end thereof.

12. A gas turbine system, comprising:
a gas turbine including a rotor shaft and an exhaust housing;
a load coupling coupled to a rear end of the rotor shaft of the gas turbine and extending through the exhaust housing of the gas turbine; and
a system for cooling the load coupling, the system including:
a shroud having a frusto-conical body and mounted concentrically about the load coupling within the exhaust housing, the shroud defining an inlet passage between the shroud and the load coupling and an outlet passage between the exhaust housing and the shroud; and
a set of blades coupled to the load coupling, the set of blades angled to draw air into the inlet passage as the set of blades rotate with the load coupling.

13. The gas turbine system of claim 12, wherein the exhaust housing defines a tunnel radially spaced from the shroud, and the inlet passage and the outlet passage fluidly couple together around a forward end of the shroud within the tunnel, wherein the air flows in a forward direction in the inlet passage and a rearward direction in the outlet passage.

14. The gas turbine system of claim 13, wherein the tunnel and the load coupling define a radial opening at the forward end of the load coupling through which a gas from an upstream source enters and mixes with the air in the inlet and outlet passages.

15. The gas turbine system of claim 12, wherein at least one of a forward end and a rear end of the body has an outwardly flared surface.

16. The gas turbine system of claim 12, wherein the set of blades includes a blade mount including a plurality of segments, each segment including at least one blade of the set of blades.

17. The gas turbine system of claim 16, wherein the blade mount is configured to couple to a shaft coupler at an end of the load coupling.

18. The gas turbine system of claim 12, further comprising a shroud mount configured to mount the shroud in the exhaust housing in a spaced manner about the load coupling.

19. The gas turbine system of claim 12, wherein the shroud includes a number of segments, the number of segments configured to collectively form the shroud in a mounted state.

20. The gas turbine system of claim 12, wherein each blade is individually coupled to the load coupling, wherein each blade includes a positioning element configured to hold a position of the blade relative to at least the load coupling.

* * * * *